(12) United States Patent
Montero et al.

(10) Patent No.: US 8,239,330 B2
(45) Date of Patent: Aug. 7, 2012

(54) PAYMENT SYSTEM AND CLEARINGHOUSE OF INTERNET TRANSACTIONS

(75) Inventors: Manuel Montero, Miama Beach, FL (US); Adrian Neuhauser, Santiago (CL)

(73) Assignee: Saf-T-Pay, Inc., Miami Beach, FL (US)

( * ) Notice: Subject to any disclaimer, the term of this patent is extended or adjusted under 35 U.S.C. 154(b) by 1136 days.

(21) Appl. No.: 11/528,555

(22) Filed: Sep. 28, 2006

(65) Prior Publication Data
US 2007/0073629 A1 Mar. 29, 2007

Related U.S. Application Data

(60) Provisional application No. 60/721,132, filed on Sep. 28, 2005.

(51) Int. Cl.
*G06Q 20/00* (2006.01)
(52) U.S. Cl. .......................... 705/64; 705/75
(58) Field of Classification Search ............ 705/74
See application file for complete search history.

(56) References Cited

U.S. PATENT DOCUMENTS

| | | | |
|---|---|---|---|
| 2002/0026374 A1* | 2/2002 | Moneymaker et al. | 705/26 |
| 2003/0055781 A1 | 3/2003 | Ong | |
| 2003/0149661 A1 | 8/2003 | Mitchell et al. | |
| 2004/0243477 A1 | 12/2004 | Mathal et al. | |
| 2005/0027543 A1 | 2/2005 | Labrou et al. | |
| 2005/0033659 A1* | 2/2005 | Zucker et al. | 705/26 |
| 2005/0177464 A1* | 8/2005 | Komem et al. | 705/27 |
| 2005/0256806 A1* | 11/2005 | Tien et al. | 705/64 |
| 2008/0222046 A1* | 9/2008 | McIsaac et al. | 705/64 |

OTHER PUBLICATIONS

Int'l Search Report received in related Int'l Application No. PCT/US06/037665 dated Jul. 31, 2007.

* cited by examiner

*Primary Examiner* — Charles C Agwumezie
(74) *Attorney, Agent, or Firm* — Foley & Lardner LLP (57) ABSTRACT

An automated payment system and clearinghouse for effecting payment on online transactions without having to divulge sensitive financial information to a merchant. The payment system and clearinghouse provides a secure and safe vehicle to perform e-commerce transactions worldwide independently of the customer and merchant locations. This allows banks to offer their clients a new and alternative way to pay for internet purchases without the need to use a credit card or to divulge credit-card information or bank account information.

21 Claims, 6 Drawing Sheets

PAYMENT SYSTEM AND CLEARINGHOUSE OF INTERNET TRANSACTIONS

CROSS REFERENCE TO RELATED APPLICATIONS

This application claims priority under 35 U.S.C. §119(e) to U.S. Patent Application Ser. No. 60/721,132 filed Sep. 28, 2005, which is incorporated herein in its entirety.

BACKGROUND OF THE INVENTION

The present invention relates generally to a secure payment facilitator and clearinghouse benefiting or useful to, amongst others, online shoppers, online merchants, and banks. More specifically, the present invention relates to a system and method whereby online transactions may be completed in a secure manner without the need of a credit card and without having to share or divulge confidential or sensitive financial information to third parties.

Credit cards are generally the leading payment method for consumer purchases in the United States, both on- and off-line. From its very beginnings, internet commerce has been highly dependent upon U.S.-issued credit cards. The credit card infrastructure provided an established customer base large enough to feed e-commerce's exponential growth. As e-commerce expands into other markets, however, certain shoppers need alternative payment instruments. The various limits imposed by online commerce's dependence upon credit cards have now begun to restrict expansion of e-commerce—especially, for example, overseas.

The currently-available methods of online payment pose various problems to the consuming public. For instance, online transactions using credit card account information place the consumer at risk of identity theft or other unauthorized use of the account information. Furthermore, the consumer must share such confidential financial information with a third party, which likely maintains that information for various future unspecified uses. Also, many credit and debit cards are not accepted for use outside the country of issuance, particularly for online transactions.

There remains a need in the art, therefore, for an improved payment system and clearinghouse of internet transactions.

SUMMARY OF THE INVENTION

Systems and methods relating to an improved payment system and clearinghouse for internet transactions are provided according to this invention.

The present invention creates a centralized clearinghouse that allows customers of affiliated banks, individuals or businesses, in various countries to carry out e-commerce transactions securely—through their own, trusted financial institutions—without the need to use a credit card or transmit sensitive financial information (such as a credit-card number or bank account number) to third parties.

The platform of the present invention delivers a global secure and fraud-free clearinghouse for e-commerce (B2C) and business-to-business (B2B) transactions. It provides a merchant state-of-the-art payment interface, including transaction ID generation and an on-line and off-line banking state-of-the-art interface. It delivers custom payment options based on market needs and rules, and based on bank partner requirements. Moreover, the present invention can process transactions at a customer's local currency by providing foreign exchange capabilities. Finally, the present invention provides reporting capabilities and auditing capabilities.

In one embodiment of the invention, a customer uses the clearinghouse of the present invention to purchase goods from an internet merchant. In doing so, the consumer first selects items to purchase as typically accomplished via the merchant's website. To proceed with the purchase and initiate payment, the consumer indicates through the merchant website that he desires to use the payment system and clearinghouse of the present invention to pay for the purchase, and selects the currency for payment. Optionally, the consumer can give the merchant the shipping information for the purchased goods. The consumer has then completed the required interaction with the merchant website, without providing any sensitive financial information. The merchant then contacts the clearinghouse and provides information regarding the transaction amount and currency, and optionally provides an expiration date for the transaction.

The clearinghouse then evaluates the information from the merchant and coverts the transaction amount to the desired currency, if needed. In order to create the transaction ID, the merchant connects to the clearinghouse server which by performing an algorithm creates a unique Transaction Id number. Optionally, the clearinghouse server may interact with one or more algorithm servers to generate the transaction ID number. Similarly, in order to effect a currency conversion, the clearinghouse system may connect to a currency service which provides exchange-rate information.

The clearinghouse then provides a transaction ID number and the amount in the currency the consumer has selected for payment, for use in completing the transaction, which the merchant website provides to the customer. The clearinghouse and the merchant e-commerce server integrate using standard web services protocols, for example XML-SOAP, UDDI, or WSDL.

Next, to complete the transaction, the consumer then connects optimally to his or her online financial institution's (bank's) system, but can instead proceed with the transaction in other conventional banking methods such as by telephone or personal visit to a bank. The consumer provides the bank with the transaction ID number and amount of the transaction in the currency consumer wants to pay and authorizes payment from his account to complete the transaction. The bank verifies the payment amount and transaction ID number with the clearinghouse, informs the clearinghouse of the authorization, and then transfers the requested funds to the clearinghouse. The consumer has now completed his or her portion of the transaction.

Once the clearinghouse receives the funds and authorization, the online merchant is informed of the purchase approval and commences shipment. Shipping confirmation is forwarded back to the clearinghouse and optionally the consumer. Upon receipt of such confirmation, the clearinghouse transfers the funds to the online merchant or a designated bank of the online merchant.

In one optional embodiment of the invention, the clearinghouse forwards the funds to the online merchant or respective bank less a transaction fee or other discount which the clearinghouse maintains.

In another optional embodiment of the invention, the clearinghouse can accommodate funds received from the consumer's bank and funds transferred to the online merchant in different currencies. In doing so, the clearinghouse may charge a margin upon currency conversion.

In another optional embodiment of the invention, the consumer is also provided with an expiration date from the clearinghouse through the online merchant. The consumer must complete the transactions with his financial institution (bank) by the expiration date, or the transaction is void.

The present invention provides a transactional platform that integrates with internal and external entities based upon standard Web Services protocols. The platform incorporates full compatibility with currently-existing bank protocols, legacy systems, and software operated by these institutions. The payment platform interfaces with both financial institutions as well as online merchants to form a seamless transaction that allows the consumer to maintain confidential financial information with only the financial institution.

Once the platform receives the initial transactional information from the online merchant, the platform generates a transaction ID number and if applicable the equivalent amount in local currency. Subsequently, the platform interfaces with the consumer's financial institution to receive authorization to make the payment associated with the transaction ID number provided. Then the platform again interfaces with the online merchant to confirm authorization, and again to receive shipping confirmation.

This invention provides the customer with several benefits over existing methods of payment. For example, unlike providing bank account or credit card information directly to a merchant website, the present invention allows for such payment while keeping this sensitive financial information confidential. Moreover, the present invention eliminates the problem of merchants' varying acceptance of foreign-issued credit cards.

This invention also offers significant improvements over other current third-party payment systems, such as PayPal or escrow services. In order to use PayPal, a customer must create an account and provide personal and sensitive financial information, including bank account number(s) and/or credit card number(s), directly to PayPal. Similarly, escrow services often require credit card or bank account information, and often require significant effort to set up. In contrast, the present invention does not require such sensitive financial information to be shared with either the merchant or the clearinghouse. Moreover, according to a preferred embodiment, the customer need not even create any account with the clearinghouse. The present invention is a more broadly focused internet payment system, offered through banks to their clients to enable purchases from a wide variety of internet merchants creating a seamless, secure payment system.

BRIEF DESCRIPTION OF THE DRAWINGS

The accompanying drawings, which are included to provide further understanding of the invention and are incorporated in and constitute part of this specification, illustrate embodiments of the invention, and together with the description serve to explain the principles of the invention. In the drawings.

DETAILED DESCRIPTION OF THE VARIOUS EMBODIMENTS

Reference will now be made in detail to various embodiments of the present invention, examples of which are illustrated in the accompanying drawings.

Figure 1:
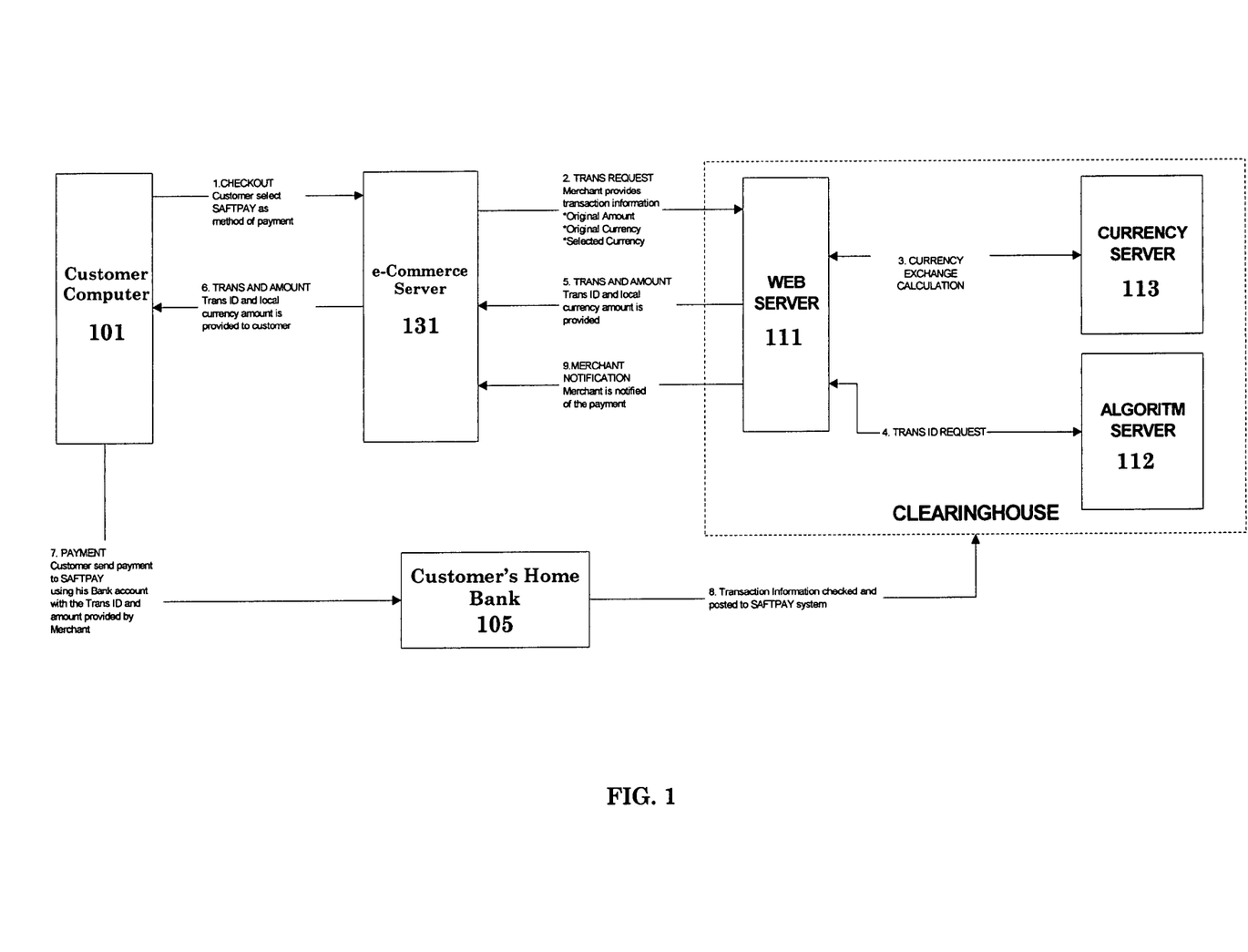
FIG. 1 shows a view of the flow of the transaction process according to an embodiment of the present invention.

FIG. 1 illustrates the interfacing between various computers and servers including the clearinghouse. The customer computer 101 interfaces with the merchant e-commerce server 131, typically as the consumer logs on the merchant's website and initiates a transaction. Arrow 1 represents the customer providing shipping information for the online merchant's check-out process. As shown by arrow 2, the merchant e-commerce server 131 transmits a transaction request to the to the clearinghouse server 111 including such information as the transaction amount, expiration date, and currency, but not private customer information. The clearinghouse server 111 evaluates the information and decides whether a currency conversion is necessary. If so, the clearinghouse optionally interfaces with a currency server 113, as depicted by arrow 3, to determine the conversion rate. The clearinghouse server 111 also interfaces with the algorithm server 112 to generate the transaction ID, shown by arrow 4. For added security, the algorithm server 112 is hosted in a different server than the clearinghouse server 111. The algorithm server 112 hosts the algorithm to generate and store the transactions ID's. After the transaction ID has been generated, the clearinghouse server 111 transmits the same back along with the transaction amount in local currency, shown by arrow 5, to the merchant e-commerce server 131 which in turn transmits, shown by arrow 6, the transaction ID and amount in local currency back to the customer computer 101.

The customer must authorize the payment of the transaction with the customer's bank 105. In this embodiment, that action is taken online via the customer's computer 101 and its interface with the bank's server. But in alternative embodiments, the customer may authorize payment though a branch office of the bank or a bank's telephonic service. Once payment is confirmed and authorized, including transaction information and amount to pay, by the customer through the computer 101 to the customer's bank 105 (depicted by arrow 7), the bank 105 interfaces with the clearinghouse server 111. As shown by arrow 8, the clearinghouse server 111 checks the transaction information against its records and accepts a funds transfer from the bank 105. Finally, the clearinghouse server 111 interfaces again with the merchant e-commerce server 131 to inform the merchant of payment, depicted by arrow 9.

Figure 2A:
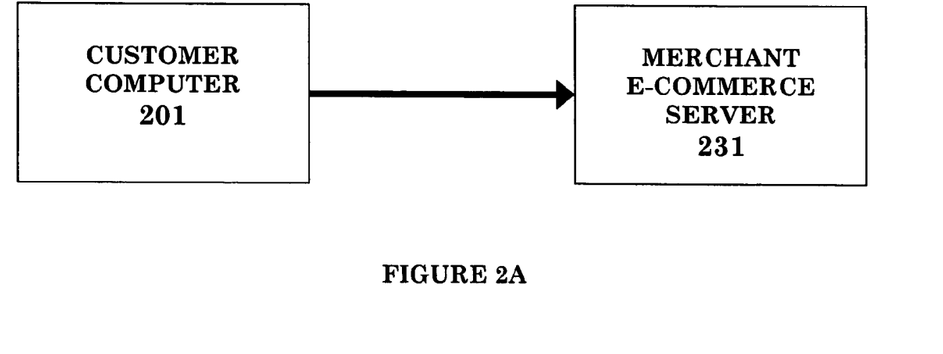
FIGS. 2A-2L show a step-by-step view of the system interactions according to an embodiment of the present invention.

Turning to FIGS. 2A-2L, several step-by-step views of the system interactions according to an embodiment of the present invention can be seen. Specifically, FIG. 2A shows the interface between a customer's computer 201 and a merchant's e-commerce server 231. During the pre-transaction phase, the customer selects the items to purchase, selects the clearinghouse as the method of payment, and optionally indicates the preferred currency. This information is conveyed through the customer's computer 201 to the merchant's e-commerce server 231.

Figure 2B:
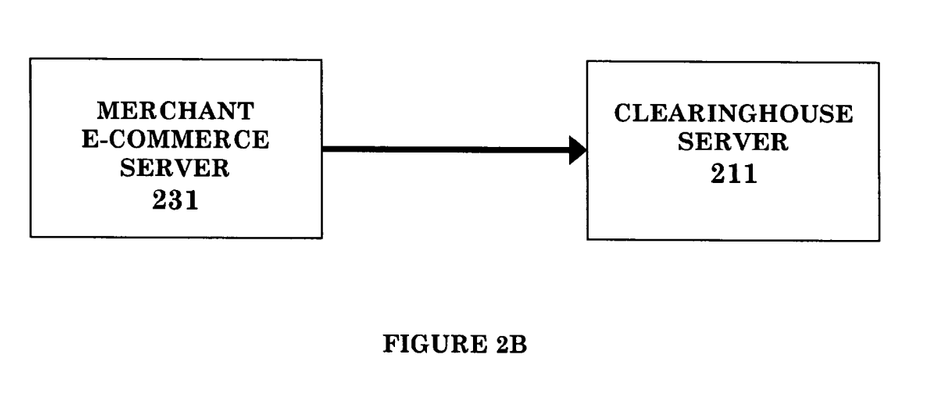

FIG. 2B shows the resulting interface between the merchant's e-commerce server 231 and the clearinghouse server 211. The merchant's e-commerce server 231 provides the relevant transaction information, which may include the transaction amount, expiration date, and currency, to the clearinghouse server 211 for processing. This interface uses standard web services protocols, including XML-SOAP.

Figure 2C:
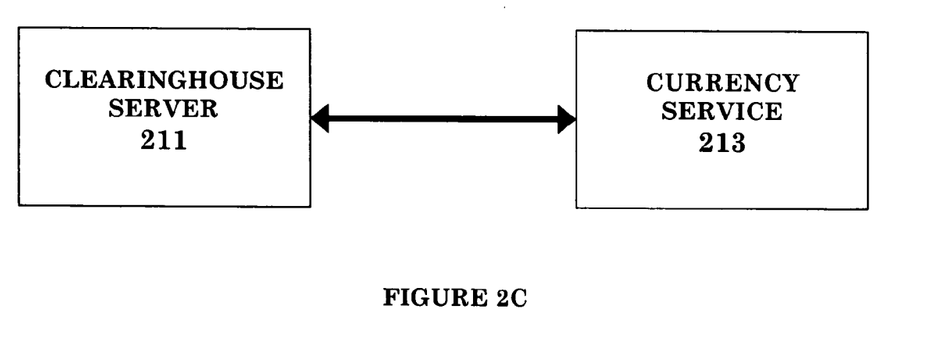

FIG. 2C shows the optional two-way interface between the clearinghouse server 211 and a currency service 213, which provides currency-exchange information if necessary.

Figure 2D:
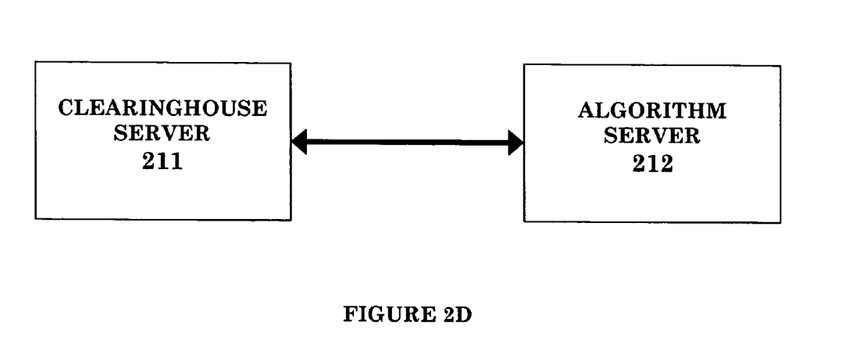

FIG. 2D shows the optional two-way interface between the clearinghouse server 211 and the algorithm server 212. For added security, the algorithm server 212 may be hosted in a different server than the clearinghouse server 211. The algorithm server 212 hosts the algorithm to generate and store the transactions ID's. The clearinghouse server 211 transmits the relevant transaction information to the algorithm server 212, which in turn transmits the transaction ID back to the clearinghouse server 211.

Figure 2E:
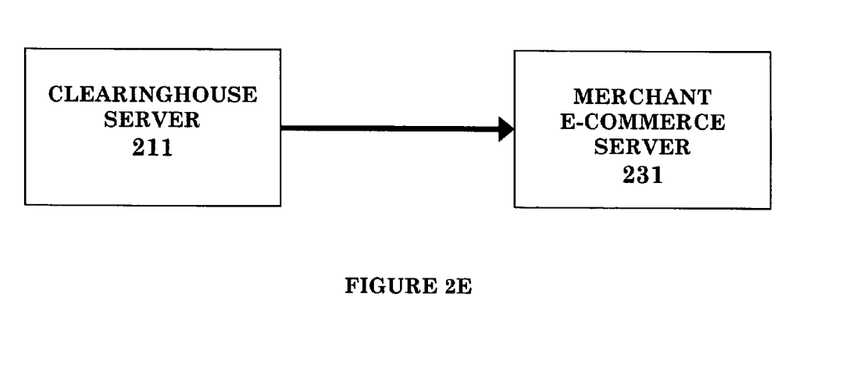

FIG. 2E shows the interface between the clearinghouse server 211 and the merchant e-commerce server 231. Once the transaction ID has been assigned, the clearinghouse server 211 provides that information as well as a local currency quote, if desired, to the merchant e-commerce server 231. This interface also uses standard web services protocols, including XML-SOAP.

Figure 2F:
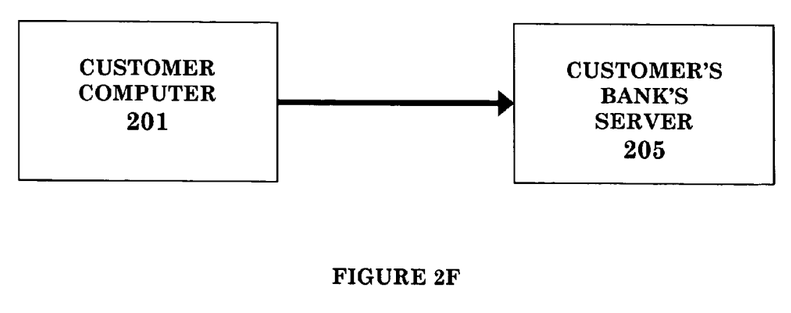

FIG. 2F begins to show the sequence of steps and interfaces during the transaction phase. In this embodiment, the transaction authorization from the customer is conducted electronically. The customer computer 201 interfaces with the customer's bank's server 205, and provides the transaction ID and transaction amount, and authorizes payment.

Figure 2G:
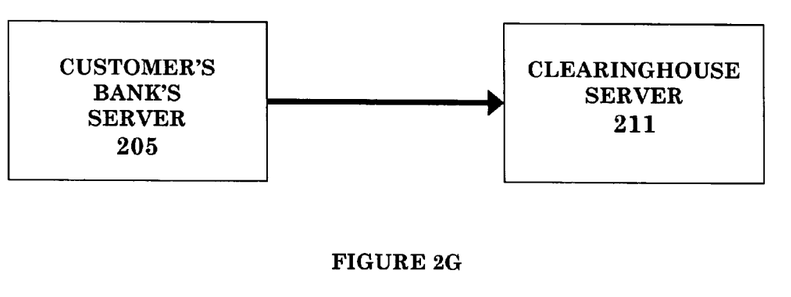

FIG. 2G shows the interface between the customer's bank's server 205 and the clearinghouse server 211, through which the bank's server 205 verifies that the authorization for payment has been given by the customer. In doing so, the bank's server 205 also verifies the validity of the transaction ID number. This interface uses standard web services protocols.

Figure 2H:
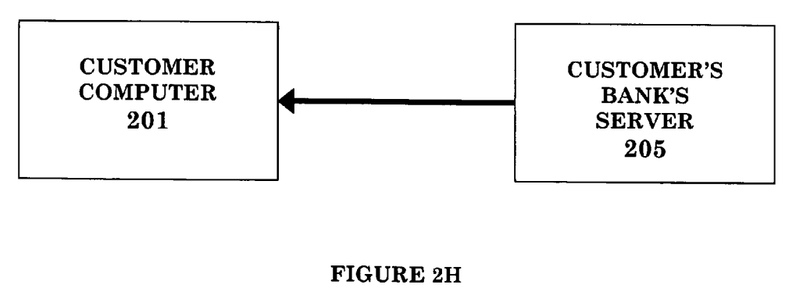

FIG. 2H shows that once the bank's server 205 verifies the validity of the transaction ID number and verifies that authorization has been given, the bank informs the customer of the same. In this embodiment, the bank's server 205 conveys that information through an interface with the customer computer 201.

Figure 2I:
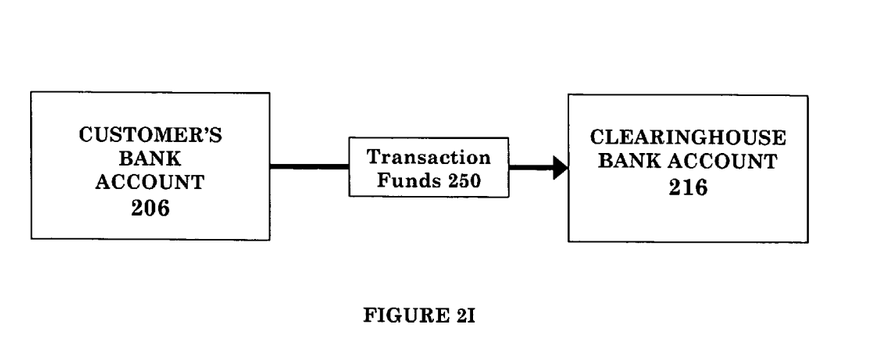

FIG. 2I shows the final step in the transaction phase. The transaction funds 250 are withdrawn from the customer's bank account 206 and deposited into the clearinghouse bank account 216. Preferably, the transfer of funds is accomplished through a wire transfer or other electronic debit from the customer's bank account 206.

Figure 2J:
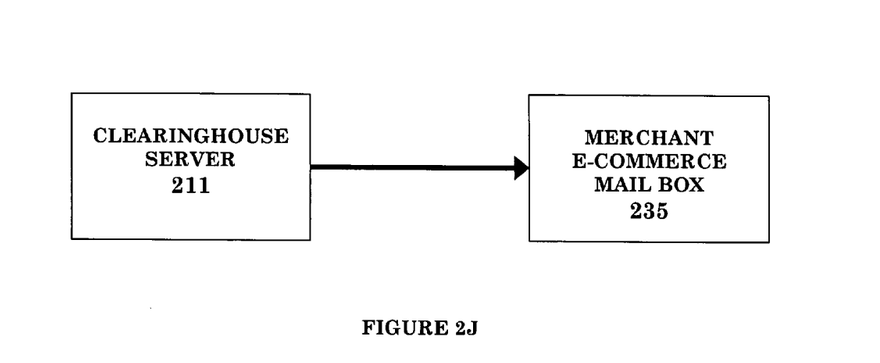

FIG. 2J begins to show the sequence of steps and interfaces during the clearing and delivery phase. Once the transaction funds 250 have been deposited into the clearinghouse bank account 216, the clearinghouse server 211 informs the merchant that a transaction has been completed, by one of several possible methods, including the following:

POST Notification, by connecting directly to the Merchants Server and sending the data informing a transaction has been paid.

EMAIL Notification, sends an electronic message to the merchant e-commerce mail box 235, confirming that the transaction has been paid.

Figure 2K:
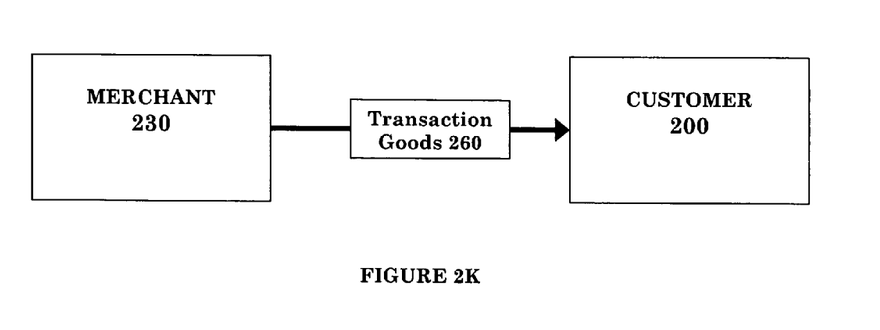

FIG. 2K shows the shipment of the transaction goods 260. Once the merchant 230 matches the paid transaction ID with the existing transaction in its database, the merchant 230 ships the transaction goods 260 (or performs the purchased services) to the customer 200.

Figure 2L:
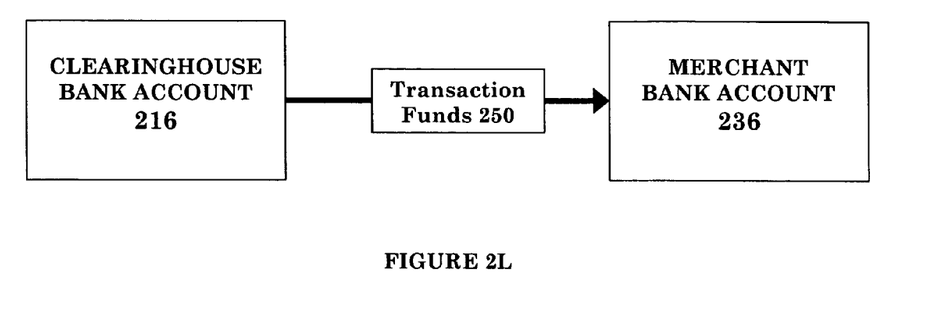

FIG. 2L shows the settlement phase of the overall transaction. Once the transaction goods 260 have been shipped, the merchant 230 notifies the clearinghouse and optimally provides a proof-of-delivery. Thereafter, the net transaction funds 251 are withdrawn from the clearinghouse bank account 216 and deposited in the merchant bank account 236. Any clearinghouse fees or commissions have been subtracted from the transaction funds 250 to create the net transactions funds 251.

As a result of using the clearinghouse of the present invention, the consumer can make a purchase from a retailer without needing to provide any personal information except a shipping address. The consumer instructs his or her bank to pay for the purchase by giving the bank the transaction ID number he or she received from the merchant. The consumer's bank then pays the clearinghouse, which then guarantees payment to the merchant. The merchant then ships the merchandise to the specified address provided by the consumer at the time of purchase. On receiving confirmation of delivery, the clearinghouse transfers the payment to the merchant's bank account.

It will be apparent to those skilled in the art that various modifications and variations can be made to the invention without departing from the spirit or scope of the invention. The foregoing description of the preferred embodiments of the invention has been presented for the purposes of illustration and description. It is not intended to be exhaustive or to limit the invention to the precise from disclosed. Many modifications and variations are possible in light of the above teaching. For instance, the present invention may be modified as need to incorporate new communication networks, protocols, or security safeguards as they are developed. It is intended that the scope of the invention be limited not by this detailed description, but rather by the claims appended hereto.

We claim:

1. A method for allowing a customer to pay for goods or services without sending any personal or financial information to a merchant except a shipping address; said method comprising the steps of:
   a. sending checkout information from a customer computer to an e-commerce server in a checkout process, said e-commerce server being controlled by the merchant;
   b. receiving the checkout information at the e-commerce server;
   c. generating payment information at the e-commerce server in response to the checkout information;
   d. sending the payment information to a clearing house server; wherein said payment information includes a cost of the goods or services;
   e. generating a transaction ID at the clearing house server and sending the transaction ID to the e-commerce server;
   f. transferring the transaction ID from the e-commerce server to the customer computer;
   g. accessing a customer's bank server with a customer computer;
   h. using the customer computer to send an authorization request to the bank server to transfer funds from a customer account to a clearing house account;
   i. sending a first verification to the clearing house server; said first verification indicating that the customer has authorized his or her bank to transfer funds from the customer account to the clearing house account;
   j. withdrawing a first amount of funds from the customer account and depositing the first amount of funds into the clearing house account;
   k. sending a second verification to the e-commerce server that the customer has transferred the funds to the clearing house server;
   l. upon successfully matching the transaction ID with a transaction in the merchant's database; shipping the goods or performing the services;
   m. notifying the clearing house server that the goods have been shipped or the services performed; and
   n. withdrawing a second amount of funds from the clearing house account and depositing the second amount of funds into an account controlled by the merchant.

2. The method of claim 1 comprising the step of selecting on the customer computer a clearing house as a method of payment for goods or services; wherein said clearing house is separate and distinct from a customer's bank or other financial institution.

3. The method of claim 1, wherein the checkout process includes transferring a shipping address of the customer but does not include transferring any other personal or financial information from the customer computer to the e-commerce server.

4. The method of claim 1, wherein the checkout process includes transferring a shipping address of the customer but does not include transferring a credit card number or bank account number.

5. The method of claim 1, wherein the checkout process consists of transferring shipping information and identifying the goods or service for purchase.

6. The method of claim 1, wherein the checkout process is not encrypted.

7. The method of claim 1, wherein the payment information includes a selected currency.

8. The method of claim 1, wherein the payment information does not include any private customer information.

9. The method of claim 1, wherein said payment information includes a cost of the goods or services; wherein the payment information does not include credit card information or bank account number.

10. The method of claim 7 wherein said payment information includes an expiration date.

11. The method of claim 1, including the step of determining whether a currency exchange is needed by interfacing with a currency server, and if so, converting the cost in a first currency to a second currency, and sending the cost in the second currency to the e-commerce server.

12. The method of claim 1, wherein the authorization request includes the transaction ID and cost of the products or services.

13. The method of claim 1, wherein said first verification includes the transaction ID.

14. The method of claim 1, wherein the first amount withdrawn is an amount equal to the cost of the goods or the services.

15. The method of claim 1, wherein the first amount withdrawn is an amount equal to the cost of the goods or the services plus a commission.

16. The method of claim 1, wherein the second verification includes the transaction ID.

17. The method of claim 1, wherein the second amount of funds deposited into account controlled by merchant equals the first amount minus a commission.

18. A method for allowing a customer to pay for goods or services without sending any personal or financial information to a merchant except a shipping address; said method comprising the steps of:
   a. sending checkout information from a customer computer to an e-commerce server in a checkout process, said e-commerce server being controlled by the merchant;
   b. receiving the checkout information at the e-commerce server;
   c. generating payment information at the e-commerce server in response to the checkout information;
   d. sending the payment information to a clearing house server; wherein said payment information includes a cost of the goods or services;
   e. generating a transaction ID at the clearing house server and sending the transaction ID to the e-commerce server;
   f. transferring the transaction ID from the e-commerce server to the customer computer;
   g. notifying the clearing house server that the customer has authorized his or her bank to transfer funds from his or her account to a clearing house account;
   h. withdrawing a first amount of funds from the customer account and depositing the first amount of funds into the clearing house account;
   i. sending a second verification to the e-commerce server that the customer has transferred the funds to the clearing house server;
   j. withdrawing a second amount of funds from the clearing house account and depositing the second amount of funds into an account controlled by the merchant.

19. The method of claim 18 comprising the steps of:
   a. upon successfully matching the transaction ID with a transaction in the merchant's database; shipping the goods or performing the services; and
   b. notifying the clearing house server that the goods have been shipped or the services performed.

20. A method for allowing a customer to pay for goods or services without sending any personal or financial information to a merchant except a shipping address; said method comprising the steps of:
   a. sending checkout information from a customer computer to an e-commerce server in a checkout process, said e-commerce server being controlled by the merchant; said checkout information containing only an identification of the goods or services desired and a shipping address of the customer;
   b. receiving the checkout information at the e-commerce server;
   c. generating payment information at the e-commerce server in response to the checkout information;
   d. sending the payment information to a clearing house server; wherein said payment information includes a cost of the goods or services;
   e. generating a transaction ID at the clearing house server and sending the transaction ID to the e-commerce server;
   f. transferring the transaction ID from the e-commerce server to the customer computer;
   g. authorizing a customer bank to transfer money from an account controlled by the customer to an account controlled by the clearing house server;
   h. notifying the clearing house server that the customer has authorized his or her bank to transfer funds from his or her account to the clearing house account;
   i. withdrawing a first amount of funds from the customer account and depositing the first amount of funds into the clearing house account;
   j. sending a second verification to the e-commerce server that the customer has transferred the funds to the clearing house server;
   k. withdrawing a second amount of funds from the clearing house account and depositing the second amount of funds into an account controlled by the merchant.

21. The method of claim 20 including using the customer computer to send the transaction ID to the customer's bank.

* * * * *